US006582145B1

(12) United States Patent
Malone et al.

(10) Patent No.: US 6,582,145 B1
(45) Date of Patent: Jun. 24, 2003

(54) PRESSURIZED CONNECTOR FOR HIGH PRESSURE APPLICATIONS

(75) Inventors: David L. Malone, Sugar Land, TX (US); Christophe M. Rayssiguier, Houston, TX (US)

(73) Assignee: Schlumberger Technology Corporation, Rosharon, TX (US)

( * ) Notice: Subject to any disclaimer, the term of this patent is extended or adjusted under 35 U.S.C. 154(b) by 183 days.

(21) Appl. No.: 09/661,088

(22) Filed: Sep. 13, 2000

(51) Int. Cl.[7] .......................... E21B 17/00; F16L 35/00

(52) U.S. Cl. ...................................... 403/31; 166/242.1

(58) Field of Search ......................... 403/31; 166/242.6, 166/242.1, 242.3

(56) References Cited

U.S. PATENT DOCUMENTS

| | | | | | |
|---|---|---|---|---|---|
| 2,701,614 | A | * | 2/1955 | Ragan et al. | 166/242.6 |
| 3,725,580 | A | | 4/1973 | Thompson et al. | |
| 3,739,803 | A | | 6/1973 | Ferrentino | |
| 3,963,297 | A | | 6/1976 | Panek et al. | |
| 4,124,070 | A | * | 11/1978 | King et al. | 166/255 |
| 4,319,240 | A | | 3/1982 | Stone et al. | |
| 4,767,652 | A | | 8/1988 | Willie et al. | |
| 4,877,089 | A | * | 10/1989 | Burns | 166/242.6 |
| 5,194,021 | A | | 3/1993 | Oba et al. | |
| 5,257,663 | A | * | 11/1993 | Pringle et al. | 166/66.4 |
| 5,435,351 | A | | 7/1995 | Head | |
| 5,645,438 | A | * | 7/1997 | Cairns | 439/139 |
| 5,810,088 | A | * | 9/1998 | Lamirand et al. | 166/242.6 |
| 5,906,242 | A | | 5/1999 | Bruewer et al. | |
| 5,954,136 | A | | 9/1999 | McHugh et al. | |
| 5,992,468 | A | | 11/1999 | Dwiggins | |
| 5,996,689 | A | | 12/1999 | Head | |
| 6,062,265 | A | | 5/2000 | Head | |
| 6,341,652 | B1 | * | 1/2002 | Malone et al. | 166/133 |
| 6,349,767 | B2 | * | 2/2002 | Gissler | 166/242.6 |

* cited by examiner

*Primary Examiner*—Lynne H. Browne
*Assistant Examiner*—Kenn Thompson
(74) *Attorney, Agent, or Firm*—Fletcher Yoder & Van Someren; Jeffrey E. Griffin; Brigitte Jeffery

(57) ABSTRACT

A connector system for protecting the transmission of signals from and/or to a tool in a high pressure environment. The system includes a connector through which a signal transmission line, such as an electrical cable or optical fiber extends. The connector is coupled to a protective tube, and includes an internal chamber in communication with the interior of the tube. A fluid, such as a liquid, is disposed within the connector and the tubing at a pressure higher than the environmental pressure. In the event of a leak at, for instance, the connector, the high pressure fluid flows outwardly rather than allowing the inflow of deleterious fluid from the environment.

23 Claims, 6 Drawing Sheets

PRESSURIZED CONNECTOR FOR HIGH PRESSURE APPLICATIONS

FIELD OF THE INVENTION

The present invention relates generally to a connection system for prolonging the life of a signal transfer line disposed at a subsurface location, and particularly to a connector for protecting a signal transfer line, such as those containing electric cable and/or optic fiber, in a downhole, wellbore environment.

BACKGROUND OF THE INVENTION

A variety of tools are used at subsurface locations from which or to which a variety of output signals or control signals are sent. For example, many subterranean wells are equipped with tools or instruments that utilize electric and/or optical signals, e.g. pressure and temperature gauges, flow meters, flow control valves, and other tools. (In general, tools are any device or devices deployed downhole which utilize electric or optical signals.) Some tools, for example, may be controlled from the surface by an electric cable or optical fiber. Similarly, some of the devices are designed to output a signal that is transmitted to the surface via the electric cable or optical fiber.

The signal transmission line, e.g. electric cable or optical fiber, is encased in a tube, such as a one quarter inch stainless steel tube. The connection between the signal transmission line and the tool is accomplished in an atmospheric chamber via a connector. Typically, a metal seal is used to prevent the flow of wellbore fluid into the tube at the connector. This seal is obtained by compressing, for example, a stainless steel ferrule over the tube to form a conventional metal seal.

However, the hostile conditions of the wellbore environment render the connector prone to leakage. Because the inside of the connector and tube may stay at atmospheric pressure while the outside pressure can reach 15,000 PSI at high temperature, any leak results in the flow of wellbore fluid into the tube. The inflow of fluid invades the internal connector chamber and interior of the tube, resulting in a failure due to short circuiting of the electric wires or poor light transmission through the optic fibers. This, of course, effectively terminates the usefulness of the downhole tool.

It would be advantageous to have a connector system for preventing the inflow of wellbore fluids into contact with signal transmission lines proximate the connection between a protective tube and a tool.

SUMMARY OF THE INVENTION

The present invention provides a technique for preventing damage to signal transmission lines, such as electric wires and optical fibers, utilized in a high pressure, subsurface environment. The system utilizes signal transmission lines deployed in the interior of a tube connected to a tool by a pressurized connector.

The connector typically has an interior chamber. The interior chamber is filled with a fluid, such as a liquid, and pressurized until the internal pressure is greater than the external pressure acting on the connector. Thus, if leaks form about the connector, the flow of fluid is from the connector to the wellbore rather than from the wellbore into the connector.

In at least one embodiment, the high pressure fluid is supplied to the connector chamber via a fluid communication path within the interior of the tube. Preferably, the tube interior also is maintained at a higher pressure than the surrounding environmental fluid.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
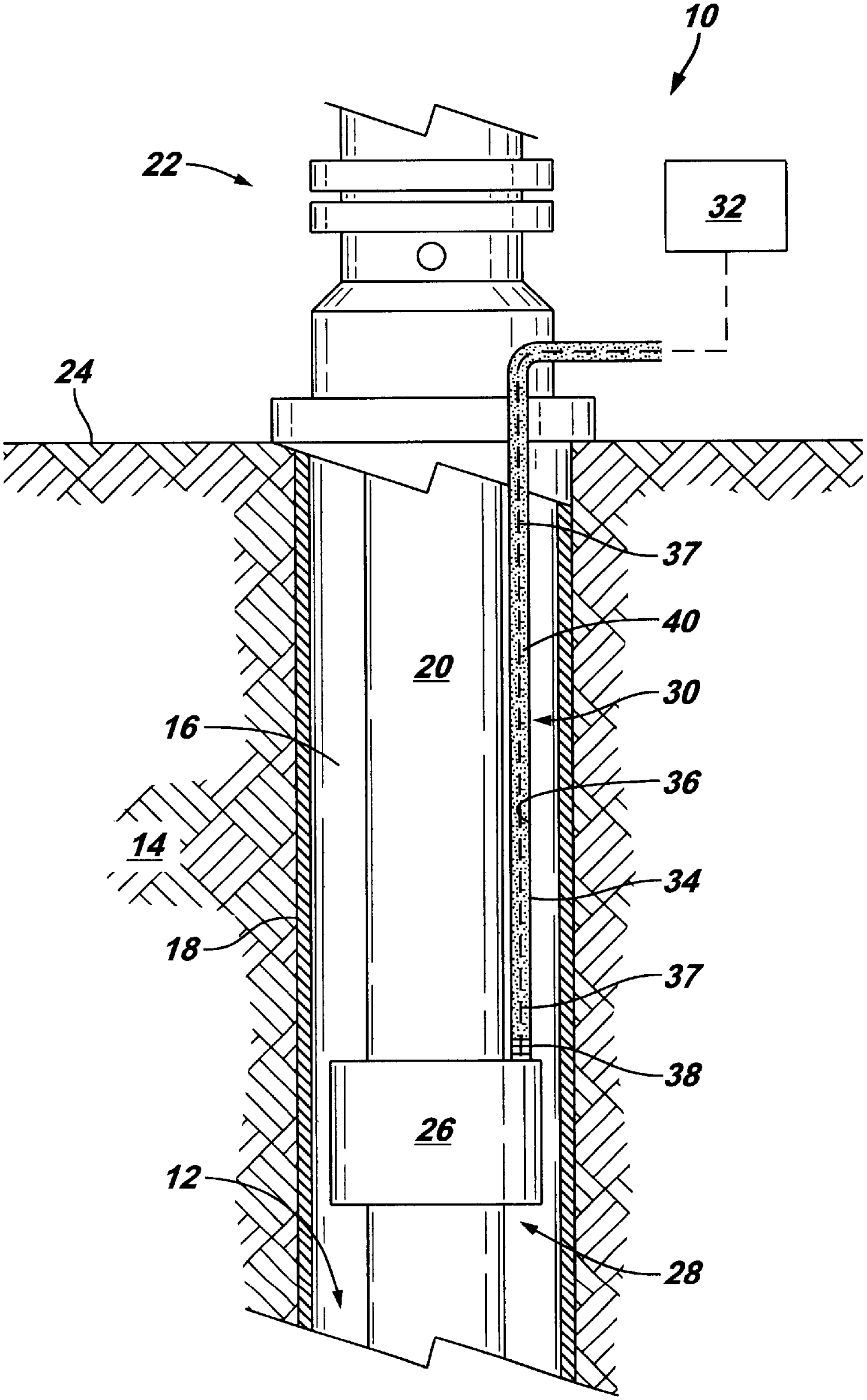
FIG. 1 is a front elevational view of a system, according to a preferred embodiment of the present invention, utilized in a downhole, wellbore environment.
Figure 2:
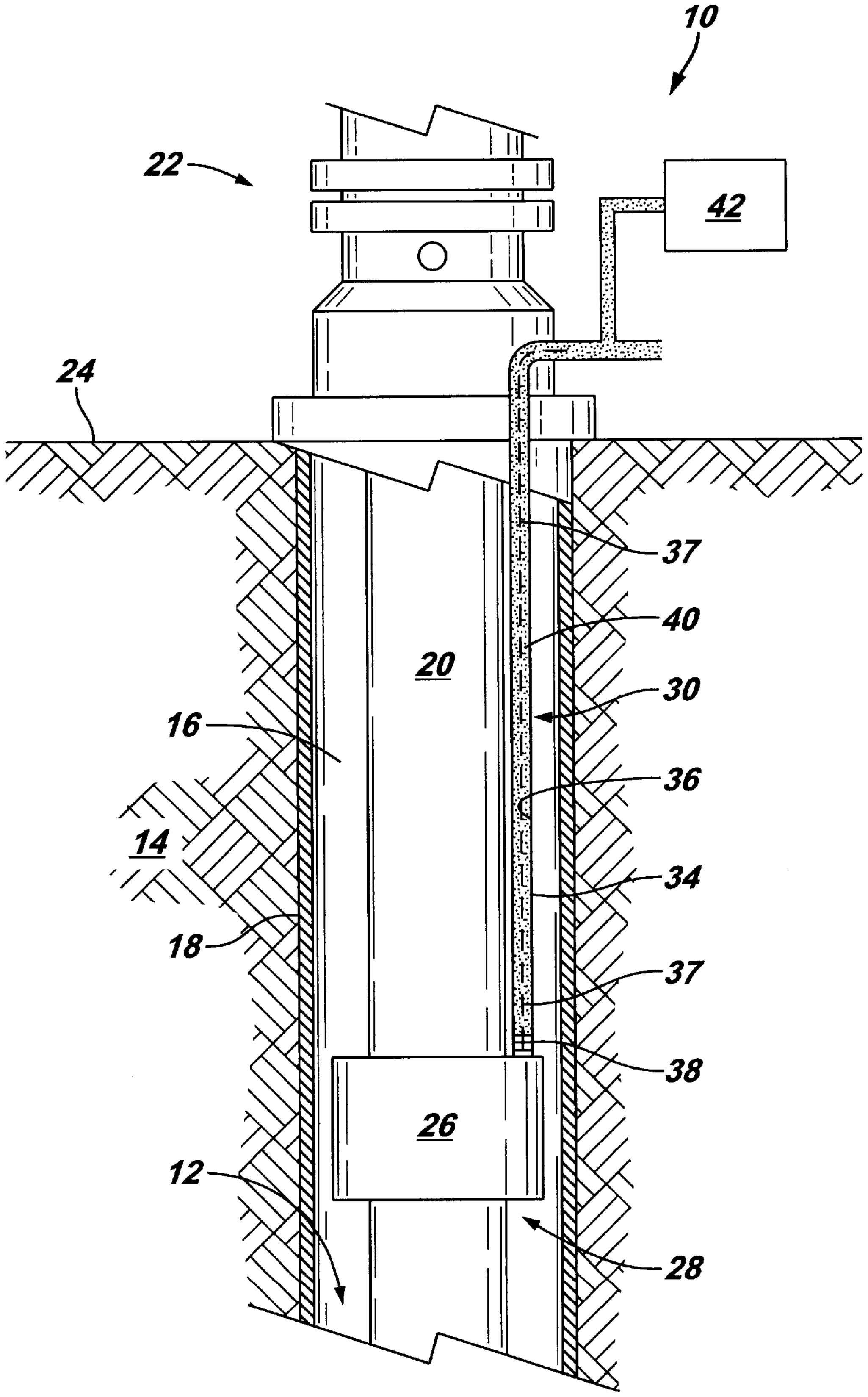
FIG. 2 is an elevational view similar to FIG. 1 but showing a pump to pressurize the system.

Referring generally to FIG. 1, a system 10 is illustrated according to a preferred embodiment of the present invention. One exemplary environment in which system 10 is utilized is a well 12 within a geological formation 14 containing desirable production fluids, such as petroleum. In the application illustrated, a wellbore 16 is drilled and lined with a wellbore casing 18.

In many systems, the production fluid is produced through a tubing 20, e.g. production tubing, by, for example, a pump (not shown) or natural well pressure. The production fluid is forced upwardly to a wellhead 22 that may be positioned proximate the surface of the earth 24. Depending on the specific production location, the wellhead 22 may be land-based or sea-based on an offshore production platform. From wellhead 22, the production fluid is directed to any of a variety of collection points, as known to those of ordinary skill in the art.

A variety of downhole tools are used in conjunction with the production of a given wellbore fluid. In FIG. 1, a tool 26 is illustrated as disposed at a specific downhole location 28. Downhole location 28 is often at the center of very hostile conditions that may include high temperatures, high pressures (e.g., 15,000 PSI) and deleterious fluids. Accordingly, overall system 10 and tool 26 must be designed to operate under such conditions.

For example, tool 26 may constitute a pressure temperature gauge that outputs signals indicative of downhole conditions that are important to the production operation; tool 26 also may be a flow meter that outputs a signal indicative of flow conditions; and tool 26 may be a flow control valve that receives signals from surface 24 to control produced fluid flow. Many other types of tools 26 also may be utilized in such high temperature and high pressure conditions for either controlling the operation of or outputting data related to the operation of, for example, well 12.

The transmission of a signal to or from tool 26 is carried by a signal transmission line 30 that extends, for example, upward along tubing 20 from tool 26 to a controller or meter system 32 disposed proximate the earth's surface 24. Exemplary signal transmission lines 30 include electrical cable that may include one or more electric wires for carrying an electric signal or an optic fiber for carrying optical signals. Signal transmission line 30 also may comprise a mixture of signal carriers, such as a mixture of electric conductors and optical fibers.

The signal transmission line 30 is surrounded by a protective tube 34. Tube 34 also extends upwardly through wellbore 16 and includes an interior 36 through which signal transmission line 30 extends. A fluid communication path 37 also extends along interior 36 to permit the flow of fluid therethrough.

Typically, protective tube 34 is a rigid tube, such as a stainless steel tube, that protects signal transmission 30 from the subsurface environment. The size and cross-sectional configuration of the tube can vary according to application. However, an exemplary tube has a generally circular cross-section and an outside diameter of one quarter inch or greater. It should be noted that tube 34 may be made out of other rigid, semi-rigid or even flexible materials in a variety of cross-sectional configurations. Also, protective tube 34 may include or may be connected to a variety of bypasses that allow the tube to be routed through tools, such as packers, disposed above the tool actually communicating via signal transmission line 30.

Protective tube 34 is connected to tool 26 by a connector 38. Connector 38 is designed to prevent leakage of the high pressure wellbore fluids into protective tube 34 and/or tool 26, where such fluids can detrimentally affect transmission of signals along signal transmission line 30. However, most connectors are susceptible to deterioration and eventual leakage.

To prevent the inflow of wellbore fluids, even in the event of leakage at connector 38, fluid communication path 37 and connector 38 are filled with a fluid 40. An exemplary fluid 40 is a liquid, e.g., a dielectric liquid used with electric lines to help avoid disruption of the transmission of electric signals along transmission line 30.

Fluid 40 is pressurized by, for example, a pump 42 that may be a standard low pressure pump coupled to a fluid supply tank. Pump 42 may be located proximate the earth's surface 24, as illustrated, but it also can be placed in a variety of other locations where it is able to maintain fluid 40 under a pressure greater than the pressure external to connector 38 and protective tube 34. Due to its propensity to leak, it is desirable to at least maintain the pressure of fluid within connector 38 higher than the external pressure at that downhole location. However, if pump 42 is located at surface 24, the internal pressure at any given location within protective tube 34 and connector 38 typically is maintained at a higher level than the outside pressure at that location. Alternatively, the pressure in tube 34 may be provided by a high density fluid disposed within the interior of the tube.

In the event connector 38 or even tube 34 begins to leak, the higher internal pressure causes fluid 40 to flow outwardly into wellbore 16, rather than allowing wellbore fluids to flow inwardly into connector 38 and/or tube 34. Furthermore, if a leak occurs, pump 42 preferably continues to supply fluid 40 to connector 38 via protective tube 34, thereby maintaining the outflow of fluid and the protection of signal transmission line 30. This allows the continued operation of tool 26 where otherwise the operation would have been impaired.

In fact, pump 42 and fluid communication path 37 can be utilized for hydraulic control. The ability to move a liquid through tube 34 may also allow for control of certain hydraulically actuated tools coupled to tube 34.

Figure 3:
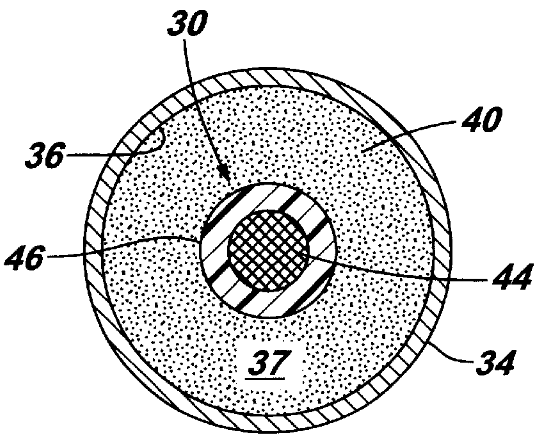
FIG. 3 is a cross-sectional view of an exemplary combination of a signal transmission line extending through the interior of a protective tube, according to a preferred embodiment of the present invention.
Figure 4:
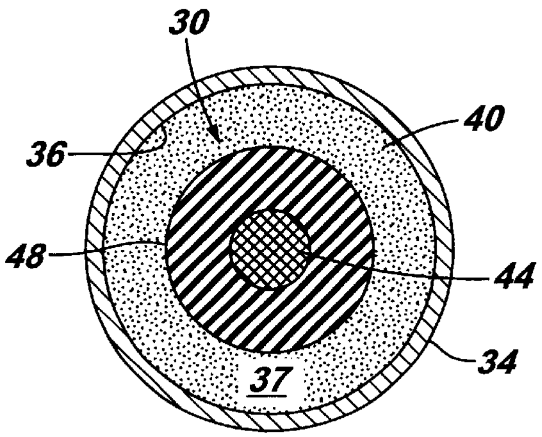
FIG. 4 is a cross-sectional view similar to FIG. 3 illustrating an alternate embodiment.
Figure 5:
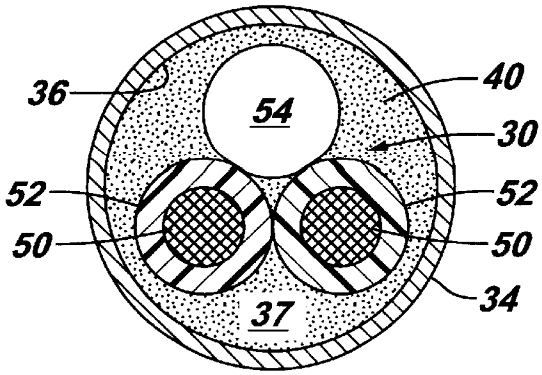
FIG. 5 is a cross-sectional view similar to FIG. 3 illustrating another alternate embodiment.

Referring generally to FIGS. 3 through 5, a variety of exemplary transmission lines 30 are shown disposed within protective tube 34. In FIG. 3, signal transmission line 30 includes a single electric wire or optic fiber 44. The single wire or optic fiber 44 is surrounded by an insulative layer 46 that may comprise a plastic material, such as non-elastomeric plastic. Fluid 40 surrounds the signal transmission line 30 within the interior 36 of tube 34.

In FIG. 4, the wire or optic fiber 44 is surrounded by a thicker insulation layer 48, such as an elastomeric layer. The radial thickness of insulation 48 is selected according to the specific gravity or density of fluid 40 to provide a support for signal transmission line 30. For example, if fluid 40 is a dielectric liquid, insulation layer 48 is selected such that signal transmission line 30 is supported within fluid 40 by its buoyancy. Preferably, the average density of insulation layer 48 and wire or fiber 44 is selected such that the signal transmission line 30 floats neutrally within fluid 40. In other words, there is minimal tension in line 30, because it is not affected by a greater density relative to the liquid (resulting in a downward pull) or a lesser density (resulting in an upward pull).

In the alternate embodiment illustrated in FIG. 5, a plurality of wires, optic fibers, or a mixture thereof, is illustrated as forming signal transmission line 30. Each wire or fiber 50 is surrounded by a relatively thin insulation layer 52 and connected to a float 54. Float 54 preferably is designed to provide signal transmission line 30 with neutral buoyancy when disposed in fluid 40, e.g. a dielectric liquid.

Figure 6:
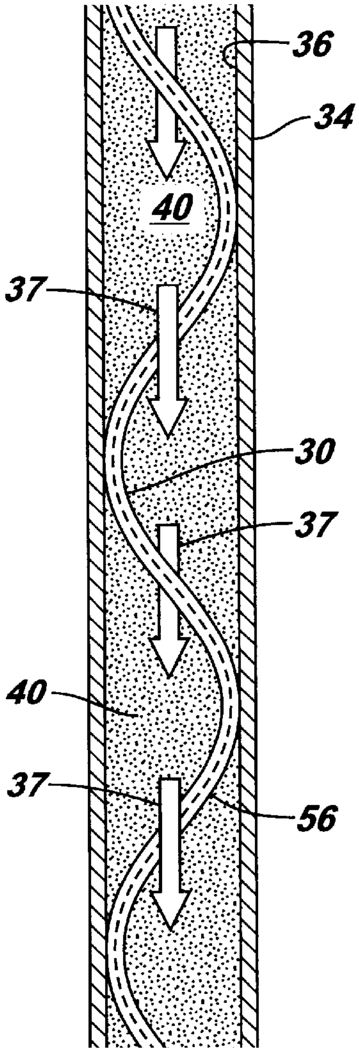
FIG. 6 is a cross-sectional view taken generally along the axis of an exemplary protective tube, illustrating another alternate embodiment.
Figure 6A:
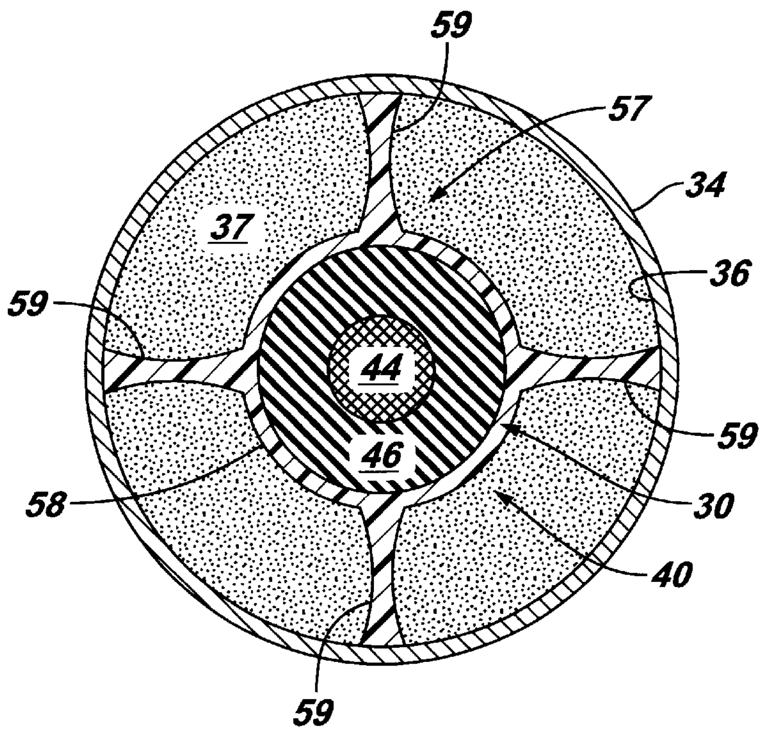
FIG. 6A is a radial cross-sectional view illustrating another alternate embodiment.

Other embodiments for supporting signal transmission line 30 within tube 34 are illustrated in FIGS. 6 and 6A. As illustrated in FIG. 6, for example, line 30 may be supported by contact with the interior surface of tube 34. With this type of physical support, it may be desirable to wrap any conductive wires or optical fibers in an outer wrap 56 that has sufficient stiffness to permit frictional contact between outer wrap 56 and the interior surface of tube 34 at multiple locations along tube 34.

Figure 6B:
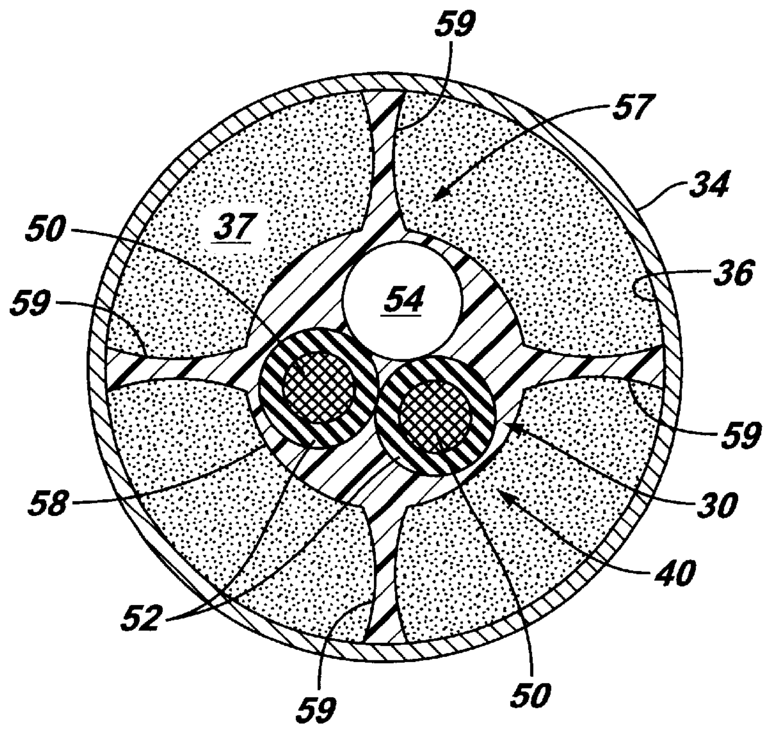
FIG. 6B is a cross-sectional view similar to FIG. 6A but showing a different transmission line.

In another embodiment, illustrated in FIGS. 6A and 6B, signal transmission line 30 is supported by a support member 57. Member 57 extends between the inner surface of tube 34 and signal transmission line 30 to provide support. An exemplary support member 57 includes a hub 58 disposed in contact with line 30 and a plurality of wings 59, e.g. four wings, that extend outwardly to tube 34. Wings 59 permit uninterrupted flow of fluid along fluid communication path 37.

In an exemplary application, tube 34 is drawn over support member 57 to provide an interference fit. Preferably, an interference fit is provided between signal transmission line 30 and hub 58 as well as between the radially outer ends of wings 59 and the inner surface of tube 34. It also should be noted that if tube 34 is formed of a polymer rather than a metal, the polymer tube can be extruded on the winged profile of support member 57.

Additionally, the winged support members can be used to draw a second tube, such as a stainless steel tube, over an inner steel tube, such as tube 34 or other types of tubes able to carry signal and/or power transmission lines. Effectively, any number of concentric tubes, e.g. steel or polymer tubes, with varying internal diameters, can be supported by each other via concentrically deployed support member 57.

Wings 59 may have a variety of shapes, including hourglass, triangular, rectangular, square, trapezoidal, etc., depending on application and design parameters. Also, the number of wings utilized can vary depending on the configuration of the signal and/or power transmission lines. Exemplary materials for support member 57 include thermoplastic, elastomer or thermoplastic elastomeric materials. Many of these materials permit the winged profile of support member 57 to be extruded onto the signal and/or power transmission lines by a single extrusion. Additionally, separate winged members can be formed, and communication between the independent wings can be accomplished by cutting slots into the wings at regular intervals. One advantage of utilizing support member or members 57 (or the frictional engagement described with respect to FIG. 6) is that these embodiments do not require selection of fluids 40 or float materials that create neutral or near neutral buoyancy of line 30 within fluid 40.

Figure 7:
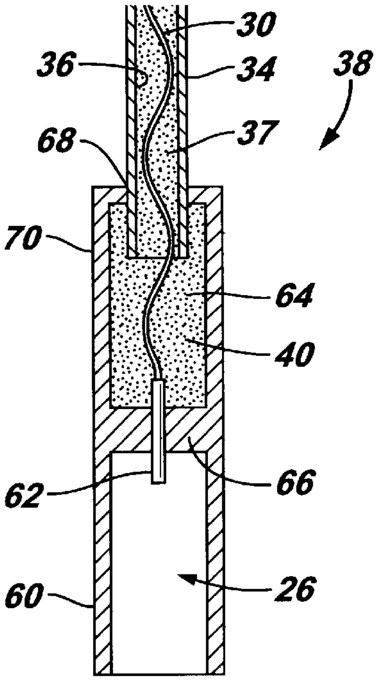
FIG. 7 is an axial cross-sectional view of an exemplary connector utilized in connecting a protective tubing to a downhole tool.

Referring generally to FIG. 7, an exemplary connector 38 is illustrated. Connector 38 includes a tool connection portion 60 designed for connection to tool 26. The specific design of tool connection portion 60 varies according to the type or style of tool to which it is connected. Typically, the signal transfer line 30 is electrically, optically or otherwise connected to tool 26 by an appropriate signal transmission line connector 62. Connector 38 also includes a connection chamber 64 that may be pressurized with fluid 40 to ensure an outflow of fluid 40 in the event a leak occurs around connector 38. Connection chamber 64 may be separated from tool connection portion 60, at least in part, by an internal wall 66.

Tube 34, and particularly interior 36 of tube 34, extends into fluid communication with connection chamber 64 via an opening 68 formed through a connector wall 70 that defines chamber 64. With this configuration, signal transmission line 30 extends through interior 36 and connection chamber 64 to an appropriate signal transmission line connector 62 coupled to tool 26. The actual sealing of tube 34 to connector 38 may be accomplished in a variety of ways, including welding, threaded engagement, or the use of a metal seal, such as by compressing a stainless steel ferrule over the connecting end of tube 34, as done in conventional systems and as known to those of ordinary skill in the art. Regardless of the method of attachment, fluid 40 is directed through interior 36 to connection chamber 64 and maintained at a pressure (P2) that is greater than the external or environmental pressure (P1) acting on the exterior of connector 38 and tube 34 at a given location.

In certain applications, it is desirable to ensure against backflow of wellbore fluids through tube 34, at least across certain zones. For example, tube 34 may extend across devices, such as a tubing hanger disposed at the top of a completion, an annulus safety valve, and a variety of packers disposed in wellbore 16 at a location dividing the wellbore into separate zones above and below the packer. If tube 34 is broken or damaged, it may be undesirable to allow wellbore fluid to flow from a lower zone to an upper zone across one or more of these exemplary devices. Accordingly, it is desirable to utilize a barrier, sometimes referred to as a penetrator, to prevent fluid flow across zones. Existing penetrators, however, do not allow fluid circulation, so they cannot be used with a pressurized connector system of the type described herein.

Figure 8:
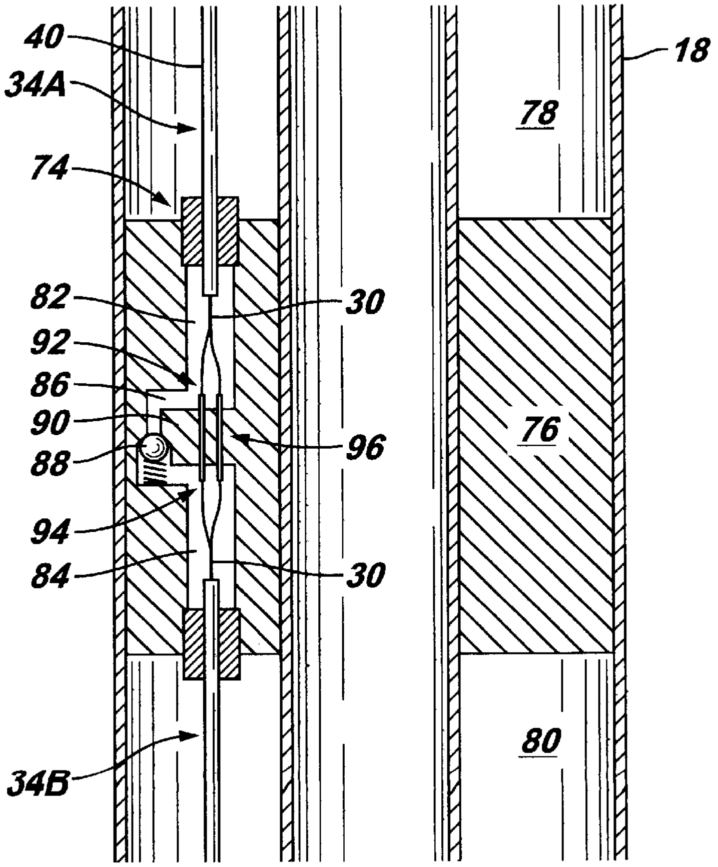
FIG. 8 is a cross-sectional view taken generally along the axis of a penetrator having a hydraulic bypass.

As illustrated in FIG. 8, an improved penetrator 74 is illustrated as deployed in a zone separation device 76, such as a packer (e.g. a feed-through packer), a tubing hanger or an annulus safety valve. Device 76 separates the wellbore into an upper annulus region 78 and a lower annulus region 80.

Tube 34 is separated into an upper portion 34A and a lower portion 34B. Upper portion 34A extends downwardly into a sealed upper cavity 82 of penetrator 74, while lower tube section 34B extends upwardly into a sealed lower cavity 84 of penetrator 74. Sealed upper cavity 82 is connected to sealed lower cavity 84 by a fluid bypass 86 that includes a one way check valve 88. Check valve 88 permits the flow of fluid 40 downwardly through penetrator 74, but it prevents the backflow of fluid in an upward direction through penetrator 74. Thus, if lower tube 34B is broken or damaged, any backflow of wellbore fluid is terminated at check valve 88.

The signal transmission line 30 passes through a solid wall 90 separating sealed upper cavity 82 from sealed lower cavity 84. Preferably, line 30 has an upper connection 92 and a lower connection 94 that are coupled together via one or more high pressure feed-throughs 96 that extend through wall 90. It should be noted that the signal transmission line 30 can be connected to a tool at and/or below penetrator 74 to provide communication and/or power to the tool. Also, fluid 40, e.g. a liquid, can be utilized not only in the actuation of tools below zone separation device 76 but also device 76 itself. For example, if device 76 comprises a hydraulically actuated packer, the fluid 40 can be selected and used for hydraulic actuation.

Figure 9:
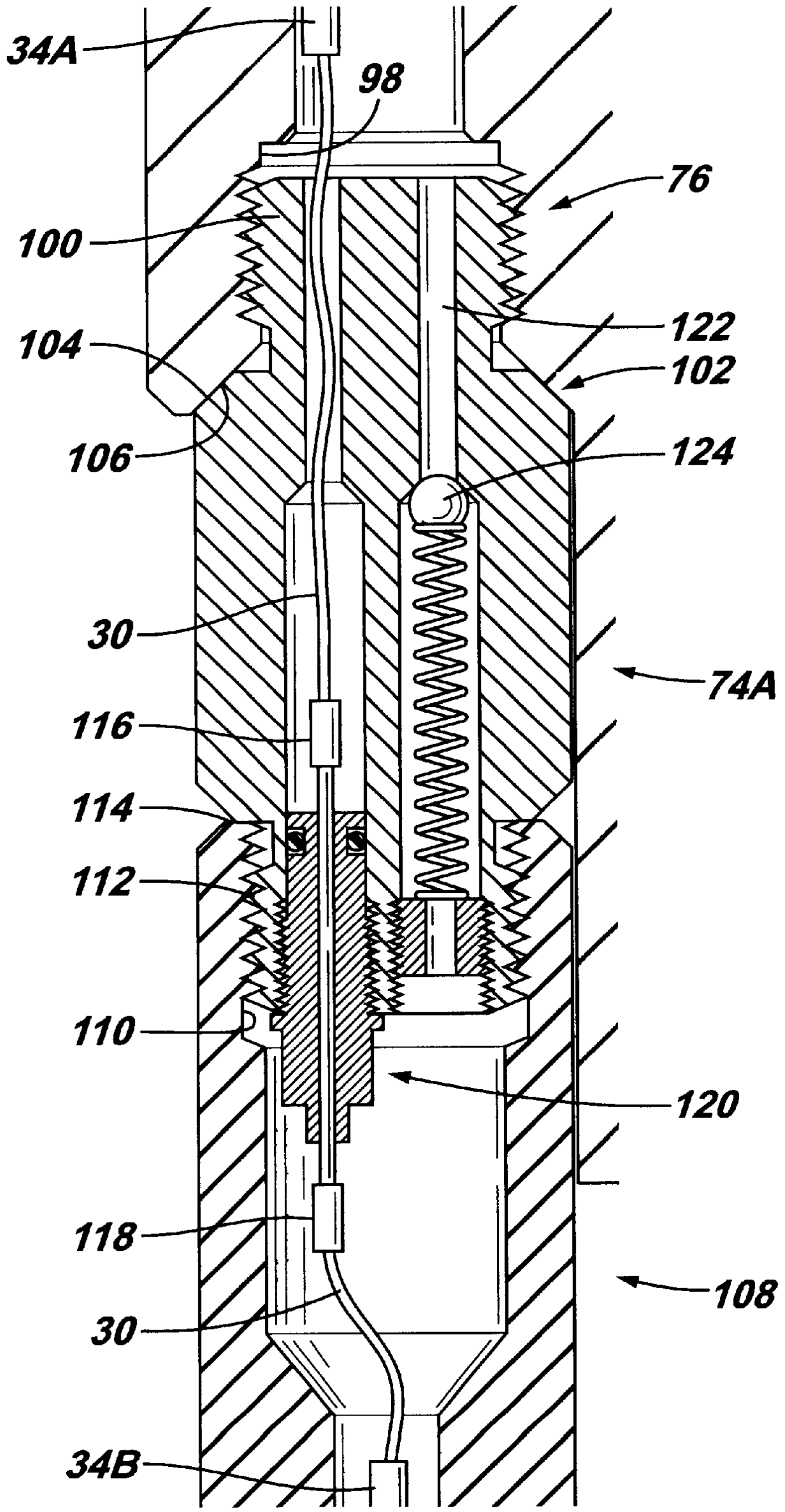
FIG. 9 is an alternate embodiment of the penetrator illustrated in FIG. 8.

An alternate embodiment of penetrator 74 is illustrated in FIG. 9 and labeled as penetrator 74A. In this implementation, penetrator 74A is designed as an independent sub to be secured, for example, to the lower face of or inside device 76, such as to the lower face or inside of a packer body.

In the embodiment illustrated, the packer body includes a threaded bore 98 for receiving a threaded top end 100 of penetrator 74A. A metal-to-metal seal 102 is formed between a chamfered penetrator edge 104 and a chamfered surface 106 disposed on the body of device 76. Additionally, the upper tube 34A is sealed to the body of device 76 by any of a variety of conventional methods known to those of ordinary skill in the art. Lower tube 34A, however, is sealed to a tubing or cable head 108 which, in turn, is sealably coupled to penetrator 74A. For example, tube head 108 may include a threaded region 110 designed for threaded engagement with a threaded lower end 112 of penetrator 74A. A seal 114 may be formed between tube head 108 and penetrator 74A when threaded regions 110 and 112 are securely engaged. Signal transmission line 30 includes an upper connector 116 and a lower connector 118 that are coupled across an electric feed-through 120 that is threadably engaged with penetrator 74A, as illustrated.

The penetrator 74A further includes a hydraulic bypass 122 that includes a check valve 124, such as a one-way ball valve. Thus, fluid 40 may flow from tube 34A downwardly through fluid bypass 122 and into lower tube 34B. However, if lower tube 34B is ruptured or damaged, any wellbore fluid flowing upwardly through lower tube 34B is prevented from flowing past device 76 by check valve 124. Accordingly, no wellbore fluids flow from a lower zone beneath the device 76 to an upper wellbore zone above device 76.

It will be understood that the foregoing description is of preferred exemplary embodiments of this invention, and that the invention is not limited to the specific forms shown. For example, the pressurized fluid system may be used in a variety of subsurface environments, either land-based or sea-based; the system may be utilized in wellbores for the production of desired fluids or in a variety of other high pressure and/or high temperature environments; and the specific configuration of the tubing, pressurized fluid, tool, signal transmission line, and penetrator may be adjusted according to a specific application or desired design parameters. These and other modifications may be made in the design and arrangement of the elements without departing from the scope of the invention as expressed in the appended claims.

What is claimed is:

1. A system for improving the useful life of a tool utilized at a downhole location in a wellbore, comprising:

a tool;

a connector configured for connection to the tool, the connector having a connection chamber that may be pressurized with a fluid at a pressure higher than the external pressure of the wellbore;

a production tubing coupled to the tool; and a protective tube coupled to the tool through the connector, the protective tube having an interior with a fluid communication path disposed in fluid communication with the connection chamber.

2. The system as recited in claim 1, further comprising a signal transfer line extending along the interior and the connection chamber for communication with the tool.

3. The system as recited in claim 2, further comprising a high pressure feed-through having a check valve.

4. The system as recited in claim 2, further comprising a liquid disposed along the fluid communication path and the connection chamber, wherein the liquid is pressurized such that the liquid pressure in the connection chamber is greater than the pressure on the exterior of the connector.

5. The system as recited in claim 4, wherein the signal transfer line comprises an optical fiber.

6. The system as recited in claim 4, wherein the signal transfer line comprises an electrical cable.

7. The system as recited in claim 4, wherein the liquid comprises a dielectric liquid.

8. The system as recited in claim 7, wherein the signal transfer line has an average density selected to permit the signal transfer line to float in the liquid.

9. The system as recited in claim 8, wherein the signal transfer line includes a plastic outer layer.

10. A connector system, comprising:

a connector having an internal connection chamber;

a protective tube coupled to the connector and disposed above the connector;

a production tube adjacent the protective tube;

a signal transmission line disposed through the protective tube and the internal connection chamber; and a fluid disposed in the internal connection chamber at a pressure higher than the external pressure acting on the connector.

11. The connector system as recited in claim 10, wherein the fluid comprises a liquid.

12. The connector system as recited in claim 11, wherein the protective tube supplies additional liquid to the internal connection chamber in the event the liquid leaks from the internal connection chamber.

13. The connector system as recited in claim 12, further comprising a tool attached to the connector.

14. The connector system as recited in claim 11, wherein the signal transmission line comprises an optical line.

15. The connector system as recited in claim 11, wherein the signal transmission line comprises an electrically conductive line.

16. A method for forming a connection between a tube and a tool in a high pressure environment, comprising:

providing a first tube adjacent a second tube;

forming a connector with a rigid outer wall and an internal chamber;

attaching the connector to a tool at a first end and to the second tube at a second end;

filling the internal chamber with a fluid; and sufficiently pressurizing the fluid to provide an outflow of the fluid in the event a leak occurs proximate the connector.

17. The method as recited in claim 16, further comprising supplying the internal chamber with the fluid via the second tube.

18. The method as recited in claim 17, wherein filling comprises filling the internal chamber with a liquid.

19. The method as recited in claim 18, further comprising locating the connector at a subsurface location.

20. The method as recited in claim 18, further comprising locating the connector at a downhole location within a wellbore.

21. The method as recited in claim 18, further comprising deploying a signal transmission line through the internal chamber.

22. The method as recited in claim 21, further comprising sending an optical signal along the signal transmission line.

23. The method as recited in claim 21, further comprising sending an electrical signal along the signal transmission line.

* * * * *